United States Patent
Zhang et al.

(10) Patent No.: US 12,236,983 B1
(45) Date of Patent: Feb. 25, 2025

(54) DIGITAL TAPE STORAGE OPTIMIZATION

(71) Applicant: International Business Machines Corporation, Armonk, NY (US)

(72) Inventors: Xizhuo Zhang, Beijing (CN); Jing Ren, Beijing (CN); Zhao Yu Wang, Beijing (CN); Yi Jie Ma, Beijing (CN); Jing Wen Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/500,368

(22) Filed: Nov. 2, 2023

(51) Int. Cl.
| | |
|---|---|
| *G11B 5/55* | (2006.01) |
| *G11B 5/09* | (2006.01) |
| *G11B 15/18* | (2006.01) |
| *G11B 20/00* | (2006.01) |
| *G11B 27/024* | (2006.01) |

(52) U.S. Cl.
CPC .......... *G11B 5/09* (2013.01); *G11B 20/00659* (2013.01); *G11B 20/00855* (2013.01); *G11B 27/024* (2013.01)

(58) Field of Classification Search
CPC ......... G11B 5/54; G11B 5/5547; G11B 15/00; G11B 5/588; G11B 15/1841; G11B 5/5543
USPC ..................... 360/75, 77.12, 78.14
See application file for complete search history.

(56) References Cited

U.S. PATENT DOCUMENTS

| | | | |
|---|---|---|---|
| 4,896,224 A * | 1/1990 | Tobe ................. | G11B 15/4677 386/318 |
| 5,581,458 A | 12/1996 | Richmond | |
| 7,864,479 B2 | 1/2011 | Ashton et al. | |
| 10,264,310 B2 * | 4/2019 | Mahadevan ....... | H04N 21/4334 |
| 10,698,867 B2 | 6/2020 | Amir et al. | |
| 10,963,432 B2 | 3/2021 | Kauffman et al. | |

FOREIGN PATENT DOCUMENTS

JP  57127974 A  1/1981

OTHER PUBLICATIONS

Yu et al., "Tape Storage Optimization at BNL" Journal of Physics: Conference Series: 2011 (7 pages).
"Interrupt Job (Interrupt a job for copying a retention set to tape)" Mar. 2, 2021 (2 pages).

* cited by examiner

*Primary Examiner* — Nabil Z Hindi
(74) *Attorney, Agent, or Firm* — Amin, Turocy & Watson, LLP

(57) ABSTRACT

Various systems and methods are presented regarding interrupting a write operation to enable a read operation to be performed on a digital tape system. An initial write operation to the tape can be paused, a read operation performed on a previously written data file conducted, and upon completion of the read operation, the write operation can be recommenced. Interrupt points can be positioned within respective data blocks. Based upon knowledge of the amount of data written during the initial write operation, a position P can be determined (relative to the location of the nearest prior interrupt point) such that when the tape is advanced to place the tape head in a position to recommence the write operation after the read operation has been performed, the tape can be positioned such that the tape head is at position P. Accordingly, interruption of the write operation enables random access of the tape.

20 Claims, 7 Drawing Sheets

DIGITAL TAPE STORAGE OPTIMIZATION

BACKGROUND

The subject disclosure relates to write and read operations performed by a tape system and a digital tape.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented to temporarily pause writing of a first data file to tape, read a second data file, and subsequently continue writing the remainder of the first data file to tape.

According to one or more embodiments, a system is provided to control read and write operations of a tape. In an embodiment, the system can comprise a memory operatively coupled to the system, wherein the memory stores computer executable components, and a processor that executes the computer executable components stored in the memory. The computer executable components can comprise a tape control component configured to control a write operation, wherein the write operation comprises writing a first data file to a tape, receive a read file instruction identifying a second data file to be read from the tape, and further, in the event of the read file instruction is received during the write operation, pause the write operation to enable the second data to be read. In an embodiment, the write operation can be paused after a first portion of the first data file has been written to the tape, and a second portion of the first data file remains to be written to the tape.

In a further embodiment, the tape control component can be further configured to control operation of a motor to position the tape to enable the second data file to be read, wherein the second data file was recorded to the tape prior to the first portion of the first data file.

In another embodiment, the tape can be configured with a series of regularly spaced interrupt points positioned along the length of the tape, and a distance between a pair of adjacent interrupt points equates to a known volume of data stored on the tape for a given feed rate of the tape. In an embodiment, the series of regularly spaced interrupt points can be incorporated into a header portion of the tape.

In an embodiment, the tape control component can be further configured to: (a) determine a volume of data comprising the first portion of the first data file, (b) determine a sequence of interrupt points included in the first portion of the first data file, (c) determine a first volume of data stored across the sequence of interrupt points, (d) determine a second volume of data, wherein the second volume of data comprises the volume of data in the first portion of the first data file that exceeds the first volume of data, and/or (e) determine an offset distance, wherein the offset distance is a length of the tape between the last interrupt point to be included during writing of the first portion of the first data file and a resume write position and equates to a length of tape required to store the second volume of data for a given tape write rate utilized when storing data to the tape.

In another embodiment, the tape control component can be further configured to control operation of the motor and at least one capstan to facilitate positioning the tape with the resume write position of the tape located adjacent to the tape head. Further, the tape control component can be further configured to control operation of the tape head to resume writing of the first data file to the tape, wherein writing of the second portion of the first data file to the tape resumes at the resume write position. In a further embodiment, tape control component can be further configured to control operation of the tape head to update information regarding the location of the first data file on the tape, wherein the updated information is stored in a header portion of the tape.

In a further embodiment, the system can further comprise a latency component configured to determine whether a time to complete writing the first data file exceeds an acceptable delay in reading the second data file, and in response to a determination that the time to complete writing of the first data file exceeds the acceptable delay, generate a write pause instruction to pause the write operation and initiate the read operation. In another embodiment, the tape control component can be further configured to, in response to receiving the write pause instruction, pause the write operation and instruct a motor to position the tape head at a start of the second file, and commence reading of the second file.

In other embodiments, elements described in connection with the disclosed systems can be embodied in different forms such as computer-implemented methods, computer program products, or other forms. In an embodiment, the computer-implemented method can comprise (a) initiating backup of a first data file to a tape, (b) receiving a read data file instruction, wherein the read data file instruction is to read a second data file previously saved to the tape, (c) pausing the backup of the first data file to the tape; and/or (d) initiating a read operation of the second file, wherein a first portion of the first data file has been saved to the tape at a time of initiating the read operation of the second file.

In a further embodiment, the computer-implemented method can further comprise based on completion of reading the second file, resuming the write operation to save a second portion of the first data file to the tape.

In another embodiment, the computer-implemented method can further comprise (a) identifying position of a series of interrupt points on the tape, wherein the series of interrupt points are regularly spaced along the length of the tape, and a distance between a pair of adjacent interrupt points equates to a known volume of data stored on the tape for a known tape write rate, (b) determining a first length of the tape occupied by the first portion of the first data, wherein the first length of tape is based on the volume of data stored in the first portion of the first data file and the known tape write rate, (c) determining a number of interrupt points included in the first portion of the first data stored on the tape, (d) determining a second length of tape between a first interrupt point in the series of interrupt points and a last interrupt point in the series of interrupt points, wherein the first length of tape occupied by the first portion of first data initiates at the first interrupt point in the series of interrupt points and includes the last interrupt point in the series of interrupt points, and/or (e) determining an offset distance, wherein the offset distance is a difference between the first length of tape and the second length of tape.

In another embodiment, the computer-implemented method can further comprise positioning the tape head at a recommence writing position, wherein the recommence writing position is the offset distance from the position of the last interrupt point. In another embodiment, the computer-implemented method can further comprise recommencing, at the recommence writing position, the backup of the first data file to the tape facilitating writing of a second portion of the first data file to the tape.

Another embodiment can further comprise a computer program product stored on a non-transitory computer-readable medium and comprising machine-executable instructions, wherein, in response to being executed, the machine-executable instructions cause a machine to perform operations, comprising automatically (a) initiating backup of a first data file to a tape; receiving a read data file instruction, wherein the read data file instruction is to read a second data file previously saved to the tape, (b) pausing the backup of the first data file to the tape, and/or (c) initiating a read operation of the second file, wherein a first portion of the first data file has been saved to the tape at a time of initiating the read operation of the second file.

In a further embodiment, the operations can further comprise, based on completion of reading the second file, automatically resuming the write operation to save a second portion of the first data file to the tape.

In another embodiment, the operations can further comprise (a) identifying position of a series of interrupt points on the tape, wherein the series of interrupt points are regularly spaced along the length of the tape, and a distance between a pair of adjacent interrupt points equates to a known volume of data stored on the tape for a known tape write rate, (b) determining a first length of the tape occupied by the first portion of the first data, wherein the first length of tape is based on the volume of data stored in the first portion of the first data file and the known tape write rate, (c) determining a number of interrupt points included in the first portion of the first data stored on the tape, (d) determining a second length of tape between a first interrupt point in the series of interrupt points and a last interrupt point in the series of interrupt points, wherein the first length of tape occupied by the first portion of first data initiates at the first interrupt point in the series of interrupt points and includes the last interrupt point in the series of interrupt points, and (e) determining an offset distance, wherein the offset distance is a difference between the first length of tape and the second length of tape. In a further embodiment, the operations can further comprise positioning the tape head at a third position, wherein the third position is the offset distance from the position of the last interrupt point, and recommencing, at the offset position, the backup of the first data file to the tape facilitating writing of a second portion of the first data file to the tape.

DESCRIPTION OF THE DRAWINGS

One or more embodiments are described below in the Detailed Description section with reference to the following drawings.

DETAILED DESCRIPTION

Figure 1:
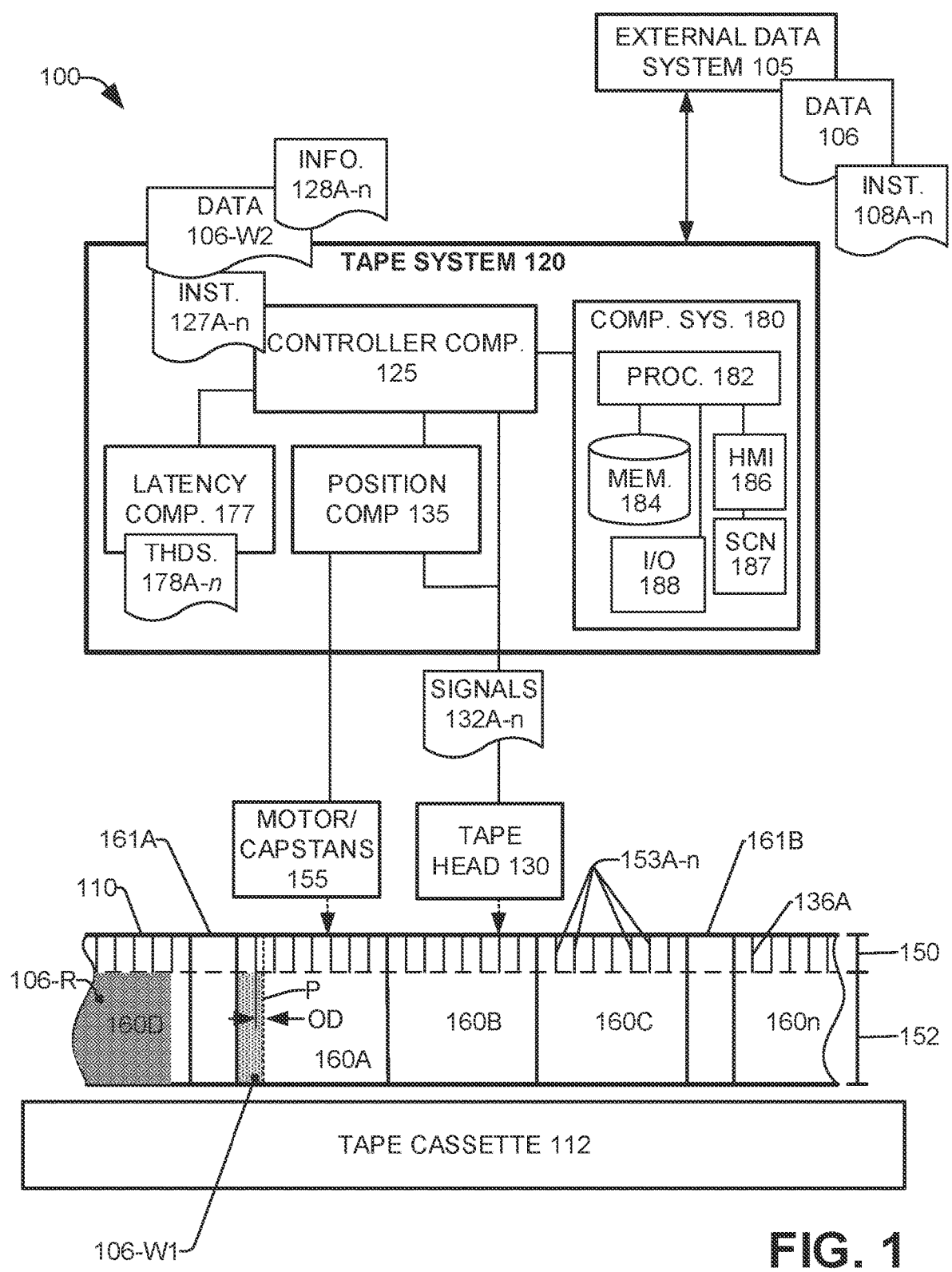
FIG. 1 illustrates a system comprising various devices and components that can be utilized in a write/read operation performed on a tape-based system, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. In the following, n denotes an integer greater than zero.

The various systems, methods, and embodiments presented herein generally relate to storage of data on a tape drive. While hard disk drives have become widespread in an information technology (IT) infrastructure (e.g., at a data center) to store/archive digital data, tape backup drives are commonly utilized as a means for storing data, e.g., in accordance with an entity's data protection strategy such as for archival and data compliance purposes. Tape drives can be configured to store digital data on tape cartridges and/or cassettes. Typically, a tape drive is used as a secondary/ancillary backup (e.g., where primary backup is a hard drive) for long term storage of data (e.g., critical data), whereby the data may not be required to be accessed frequently. In an example scenario, for data security, the tape backup process can be conducted offsite, tapes can be stored offsite, etc., while the primary backup of a frequent read from a hard drive can occur onsite.

Tape backup is still commonplace today as a function of the data storage capacity of a tape in conjunction with the cost (e.g., initial and operational cost/gigabyte (GB)) compared to hard disk backup or cloud backup. Further, operational scalability of a tape-based system is relatively cheap/easy. If handled/stored correctly, tapes have a longevity that can measure in the decades. Their inherent portability enables tapes to be stored offline which can increase the security of tapes, e.g., protects data against ransomware/malware.

Various tape systems are available, including linear tape open (LTO), digital linear tape (DLT), digital audio tape (DAT), advanced intelligent tape (AIT), quarter inch cartridge (QIC), magnetic tape, etc., with storage capacities in the tens of terabytes (TB).

Owing to the sequential format/operation of digital tape and the sequential manner in which the tape is accessed (e.g., write/read operations), an operational conflict can arise when a large volume of data is currently being written to a tape but an urgent read operation is received for the tape. For example, the tape cannot be rewound to access the data to be read until the write operation has been completed.

Conventionally, the read operation is postponed/delayed until the write operation is completed. However, where a write operation may take a long period of time (e.g., large data file being backed up to the tape, write operation has only just begun, and suchlike), the delay/latency imposed on the read operation by the write operation can render meaningless/frustrate the urgent nature of the read operation.

The various embodiments presented herein provide one or more configurations that enable read/write methods that approach a true random access methodology, rather than the sequential access that limits conventional use of a tape in a tape backup operation.

Turning to FIG. 1, system 100 presents various devices and components that can be utilized in a write/read operation performed on a tape-based system, in accordance with one or more embodiments.

As shown, system 100 can include an external data system 105 (e.g., a memory device, a primary storage device) configured to store (e.g., permanently, temporarily) digital data 106 required to be saved/backed up/written to a tape 110. System 100 can further include a tape system 120 (also known as a tape drive, tape recorder, and suchlike) wherein the tape system 120 can be configured to control operation of the tape 110, e.g., perform tape advance and tape rewind operations, perform a write operation writing data 106 to the tape 110 (e.g., across one or more data blocks), perform a read operation of reading data 106-R (e.g., from one or more data blocks) previously written/stored on the tape 110, and suchlike, as further described herein. Data 106 to be written to the tape 110 is referenced herein as data 106-W and data 106 that has been previously stored on tape 110 is referenced as data 106-R. Further, a first portion of data 106-W written during an initial/first write operation is referenced herein as data 106-W1, and a second portion of data 106-W written during a resumed/signal write operation is referenced herein as data 106-W2. Tape 110 can be housed in any suitable structure, e.g., a tape cassette 112.

The tape system 120 can include a controller component 125 (also known as a tape control component) configured to control various operations performed by the tape system 120, wherein the controller component 125 can be configured control the various operations via instructions 127A-n. The controller component 125 can be configured to receive/process one or more instructions 108A-n generated by, received from, the external data system 105, a control panel switch (e.g., located on the front of tape system 120), and suchlike, wherein the instructions 108A-n can include such operations as: write (e.g., write data 106-W to one or more data blocks 160A-n, as further described), read (e.g., read data 106-R from one or more data blocks 160A-n), write tape header label (e.g., update content of a tape header label), erase, back space one block (e.g., return to start of previous data block 160A-n), forward space one block (e.g., move to start of next data block 160A-n), forward space one file (e.g., move to beginning of next data file stored on tape 110), rewind (e.g., move to start of the tape 110), and suchlike. The respective operations performed by the various components located within and/or associated with the tape system 120 (e.g., controller component 125, position component 135, latency component 177, instructions 127A-n, instructions 108A-n, and suchlike) can collectively comprise a write operation interrupt and recommence code 880 (e.g., as further presented in FIG. 8).

Tape system 120 can also include a tape head 130 configured to write data 106-W to the tape 110, read data 106-R from the tape 110, erase data 106-R from the tape 110, and suchlike. As well as operating on data 106 (e.g., data 106-W, 106-R), the tape head 130 can also be configured to read information from a header portion 150 of the tape 110 to enable information regarding data 106-R written to a respective portion of the tape 110, and further read information to enable positioning of the tape 110 to perform/execute the write and read operations 108A-n, as further described herein. Data/information 128A-n derived from the tape 110 can be provided to the controller component 125, position component 135 (as further described), and suchlike, in the form of electronic signals 132A-n generated and transmitted by tape head 130. Information 128A-n can include number/location of interrupt points 153A-n, volume/amount of data stored between two adjacent interrupt points 153A-n, a tape write speed TW, location of data blocks 160A-n, points P, EP, OD, etc., as further described. Similarly, data/information (e.g., data 106-W) provided to the tape head 130 can be written to the tape as a function of the electronic signals 132A-n (e.g., in the form of electromagnetic interaction).

Tape system 120 can further include a position component 135, wherein the position component 135 can be configured to control operation of a motor/capstans 155 to advance and rewind the tape 110 to position a required portion of tape 110 at the tape head 130, e.g., during an initial write operation of data 106-W, a read operation of data 106-R, a subsequent write operation, and suchlike. Operation of the position component 135 and the motor/capstans 155 can be in response to instructions 127A-n generated by the controller component to control motion of the tape 110 (e.g., forward/advance or reverse/rewind) to position the tape 110 relative to the tape head as required to write data 106-W (e.g., data 106-W1, data 106-W2), read data 106-R (e.g., second data file), and suchlike.

Tape 110 can be formed from any suitable material, e.g., a polymer ribbon with a layer of magnetizable recording material such as iron-oxide or chromium oxide. Tape 110 can include regions/blocks 160A-n where data 106 can be electronically written/stored (e.g., as 0 and 1 data bits) with the respective blocks 160A-n separated by an inter-block gap 161A-n (e.g., where an inter-block gap 161A-n can be utilized to separate data blocks 160A-n and/or data 106-R saved to the tape 110). As mentioned, tape 110 can comprise of a header portion 150 and a data store portion 152 (e.g., comprising the data blocks 160A-n).

In an embodiment, the header portion 150 can include/be configured/programmed with interrupt points 153A-n, whereby the interrupt points 153A-n can be sequentially programmed along the length of the tape 110. For example, respective interrupt points 153A-n can be positioned at a distance on the tape 110 equating to 1 GB of storage of tape 110 for a given/constant tape write rate/data storage rate between a first interrupt point 153A and a second interrupt point 153B, while a data block 160A-n can be configured to be 10 GB for the same constant tape write rate (e.g., data block 160A includes eleven interrupt points 153A-K with 1 GB of data between an adjacent pair of interrupt points). Hence, if the data recording density of tape 110 is 1 GB of data can be stored on every 1 metre/meter (1m) of tape 110, respective interrupt points 153A-n can be incorporated into the tape header 150 at every 1 meter of tape 110, within a block (e.g., block 160A) of 10 GB of data storage capacity of tape length 10 m. Hence, if a write operation of 15 GB is initiated and initially halted/paused after 1.1 GB of data 106-W has been written to tape 110 by the tape system 120, the portion of tape 110 (aka the offset distance OD) that extends beyond the last interrupt point incorporated in the initial portion of data 106-W1 (e.g., an interrupt point 153B) is 0.1 m, wherein 0.1 GB of data occupies 0.1 m of tape 110 with a 1 GB/lm of tape write rate. By knowing the location of the nearest interrupt point 153A-n and the amount of data 106-W1 greater than the volume of data 106-W bounded by the interrupt point 153A-n, the position component 135, after the read operation has been performed, can advance the tape 110 to the position P at which the write operation was paused. For example, per the foregoing, P=location of interrupt point 153B+OD 0.1 m (as further described below), where P also functions as a resume write position for which a second portion (unsaved data) of the data file 106-W2 is to be written to the tape.

As well as the interrupt points 153A-n being utilized to enable a write process to be resumed, the interrupt points 153A-n can also be utilized to identify where an already written data file/block exists for the read operation. To perform the read operation, the header file 150 can be read/accessed (e.g., by tape head 130 and controller component 125), the file 106-R to be read is identified, the tape 110 is rewound to the identified start of the data block (e.g., data block 160D) for file 106-R to be read, the data block is read, the header file 150 is read/accessed once more, and the tape is subsequently advanced to the write pause position P for the write operation of data 106-W to be re-commenced.

In an embodiment, the interrupt points 153A-n (e.g., in the header portion 150 of tape 110), data blocks 160A-n, and/or inter-block gaps 161A-n can be preconfigured, e.g., by a manufacturer of tape 110. In another embodiment, as data 106 is being written to tape 110, the controller component 125 can be configured to generate the respective interrupt points 153A-n, data blocks 160A-n, inter-block gaps 161A-n, and/or information regarding data files 106-R stored in header 150, as the respective data 106-W/106-R is transferred to the tape 110, wherein the controller component 125 can be configured to generate an instruction 127A-n to tape head 130 to write the respective information (e.g., position each interrupt point 153A-n, start/end of each data block 160A-n, location of inter-block gaps 161A-n, etc.) and further store information regarding the respective locations/positions in header 150.

Tape system 120 can further include a latency component 177 and latency thresholds 178A-n. As further described, the latency component 177 can be configured to determine a time T to complete a write operation of data 106-W, compare time T with a latency value LV defined in a threshold 178A, and further determine whether the write operation of data 106-W is to be interrupted (e.g., T≥LV) or the write operation can be completed prior to the read operation of data 106-R being initiated. In an embodiment, the latency component 177 can determine time T as a function of the volume/amount of data 106-W2 remaining to be written to tape 110 and the tape write rate utilized by tape system 120 writing data 106-W to tape 110.

It is to be appreciated that while the foregoing describes the interrupt points 153A-n are located in the header portion 150 of tape 110, the interrupt points 153A-n can be located in any suitable portion of tape 110, e.g., created in the data blocks 160A-n by tape head 130, as part of the write operation of data 106-W, or similar location.

As shown in FIG. 1, tape system 120 can further include a computer system 180. Computer system 180 can include a memory 184 that stores the respective computer executable components (e.g., controller component 125, position component 135, latency component 177, and suchlike) and further, a processor 182 configured to execute the computer executable components stored in the memory 184. Memory 184 can further be configured to store any of data 106, 106-W, 106-W1, 106W2, 106-R, instructions 108A-n, instructions 127A-n, thresholds 178A-n, and suchlike. The computer system 180 can further include a human machine interface (HMI) 186 (e.g., a display, a graphical-user interface (GUI)) which can be configured to present various information, e.g., operational status updates such as write operation paused, write operation recommenced, read operation in progress, etc., as well as receive operator input (e.g., human interaction with the tape system 120) regarding initiating the read operation, and suchlike. HMI 186 can include an interactive display/screen 187 to present the various information. HMI 186 can include interactive buttons (not shown) to enable manual operation of the tape system 120. Computer system 180 can further include an I/O component 188 to receive data 106, instructions 108A-n, transmit instructions 127A-n (e.g., an operational status of the tape system 120, write/read operations, and suchlike) to the external data system 105, and suchlike.

Figure 2:
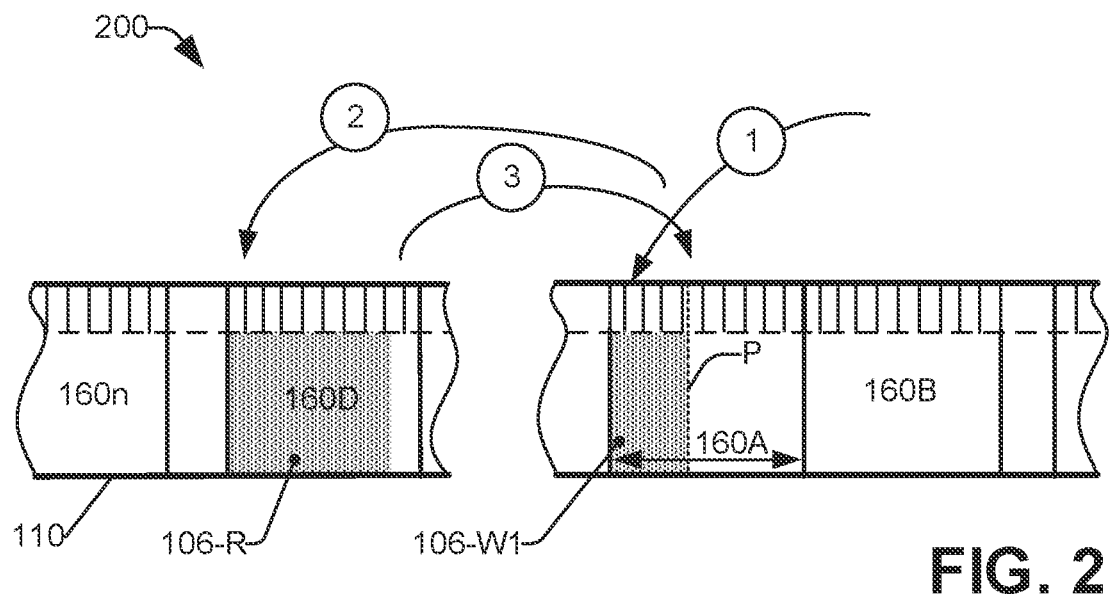
FIG. 2 illustrates a tape with interrupt points implemented to enable a write operation to be interrupted, in accordance with an embodiment.

Turning to FIG. 2, system 200 illustrates a tape with interrupt points implemented to enable a write operation to be interrupted, in accordance with an embodiment. FIG. 2 provides, in steps 2-1 to 2-3, an overview of a write operation being paused, a read operation being performed, and the write operation being subsequently resumed. As shown in FIG. 2, a tape 110 comprises a series of data blocks 160A-n, wherein a data block 160A-n can be a portion of tape 110 in which a given volume of data 106 can be stored. For example, with a given tape write speed, data block 160A (and similarly any of data blocks 160B-n) can be configured to store 10 GB of data 106. As previously mentioned, with a conventional approach, the writing of data 106 to the respective block 160A-n cannot be interrupted until the entirety of data 106-W is written to the data blocks 160A-n. For example, where a data file 106-W comprises 25 GB, and data blocks 160A-n are respectively configured to store 10 GB in each data block, the write operation cannot be terminated until the 25 GB is written to the tape, such that the 25 GB is written to 2.5 data blocks (e.g., data blocks 160M, 160N, and half of 160P). However, as presented herein, writing of the data file 106-W can be interrupted.

As shown, at 2-1, a write operation of data 106-W is initiated in response to an instruction 108A. With data block 160A being the next free block on tape 110, the write operation can be performed initiating at start of data block 160A.

As shown at 2-2, a read instruction (e.g., in instruction 108B) is received. The write operation can be paused by controller component 125. As part of pausing the writing operation, the amount of data 106-W (e.g., first data portion 106-W1) written to the data block 160A can be determined by the controller component 125 relative to the nearest interrupt point 153A-n, wherein the determined position P of the tape 110 at which the write operation was paused can be stored (e.g., by controller component 125 in memory 184). With position P determined for the first data portion 106-W1, tape 110 can be rewound (e.g., by motor/capstans 155) to position the start of data block 160C at the tape head 130.

At 2-3, upon completion of the read operation, the tape 110 can be advanced back to position P for the write operation to be resumed. As mentioned, by knowing the amount of data written prior to the write process being paused (e.g., first portion of data 106-W1), it is possible to determine the position P to which the tape 110 is to be advanced to enable the write process to be resumed. Upon completion of the write operation of data 106-W1 and 106-W2, information in the header file can be updated (e.g., by controller component 125 and information in a write data instruction 127A-n) regarding size, location, etc., of the data in the form of data 106-R.

Figure 3:
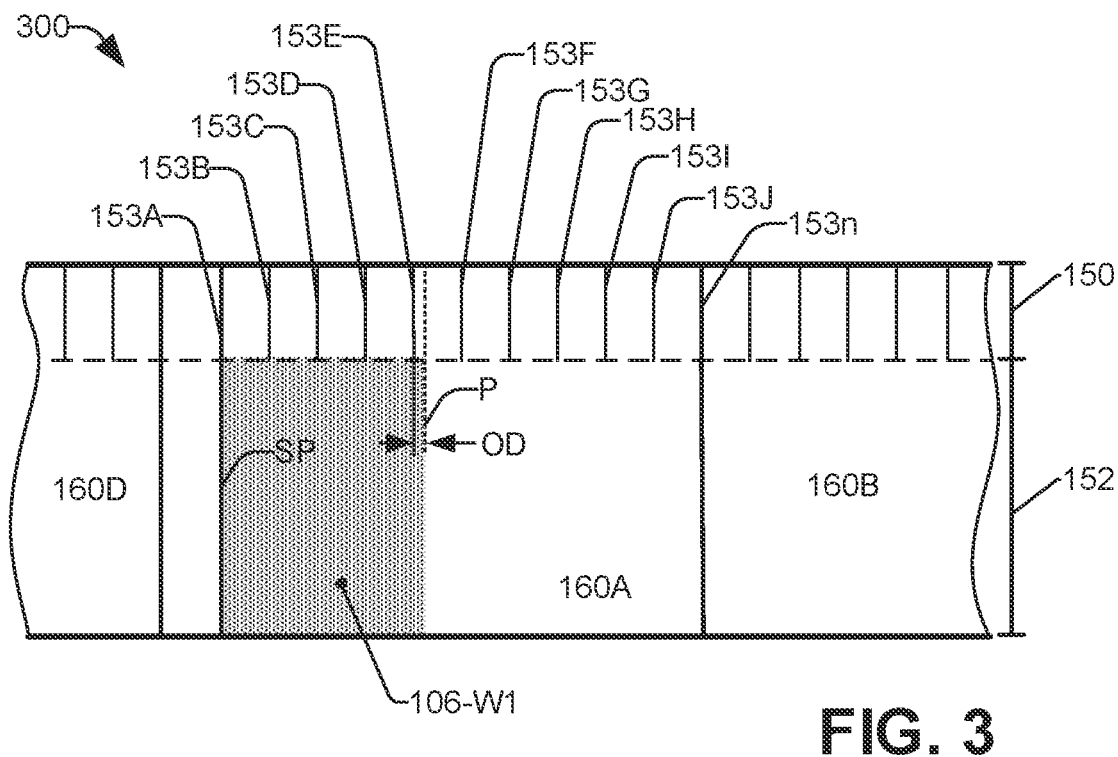
FIG. 3 presents a schematic illustrating an offset distance OD being determined for resumption of a write operation, in accordance with an embodiment.

Turning to FIG. 3, schematic 300 illustrates an offset distance OD being determined for resumption of a write operation, in accordance with an embodiment. As mentioned, a tape 110 can be separated into respective blocks 160A-n in which data 106 can be written to/read from. In an example scenario, each of the blocks 160A-n can be configured to store a particular amount of data, for example, operation of tape 110 can be configured such that blocks 160A, 160B, 160n each respectively store 10 GB of data. Hence, as shown, a write operation can be configured to store 9.5 GB of data 106-W, wherein the 9.5 GB of data will largely occupy data block 160A. However, the write operation is interrupted by the read operation, at which point only 4.2 GB (e.g., as first portion of data file 106-W1) of the 9.5 GB has been written.

With the header portion 150 comprising interrupt points 153A-n regularly/evenly spaced at 1.0 GB intervals (e.g., as identified in the header portion 150), the write operation of 4.2 GB will involve the tape 110 moving from the start position SP of block 160A through 5 interrupt points 153A-E (where interrupt point 153A coincides with the start position of block 160A), with writing of the 0.2 GB of data 106-W1 extending a write distance (offset distance OD) from interrupt point 153E equivalent to 0.2 GB (e.g., with a data recording density of 1 GB/100 cm of tape 110, 0.2 GB will occupy 20 centimeters (cm) of tape 110 beyond interrupt point 153D. Interrupt point 153E is the last interrupt point in a sequence of interrupt points 153A-n included in the first portion of data file 106-W1 (e.g., with tape 110 moving in a right to left motion in FIGS. 1-4).

Figure 4:
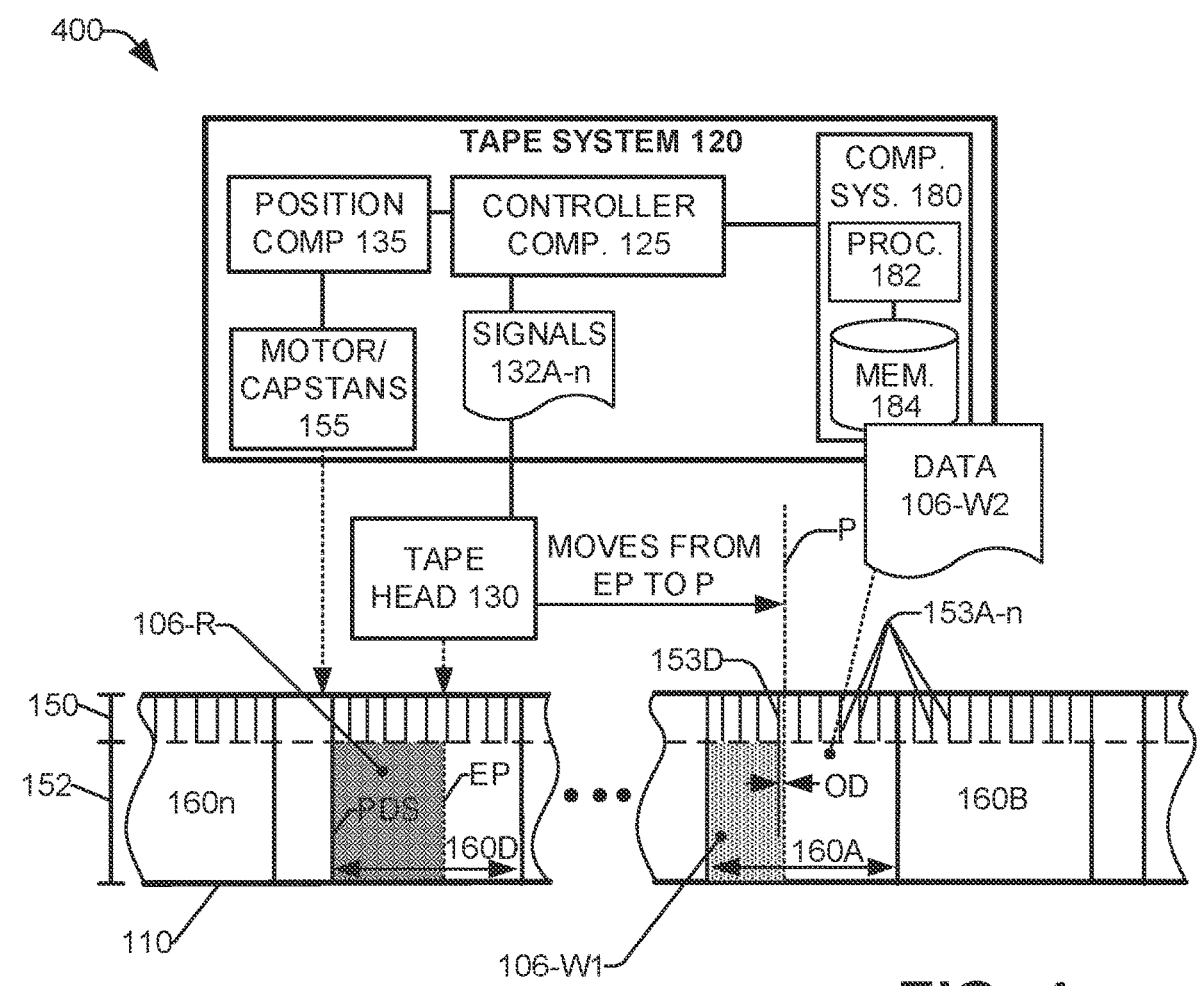
FIG. 4 presents a schematic illustrating a write operation being recommenced after a read operation, in accordance with an embodiment.

FIG. 4, schematic 400 illustrates a write operation being recommenced after a read operation, in accordance with an embodiment. As shown, a write operation of data 106-W to tape 110 has been interrupted/paused such that only the first portion data 106-W1 has been written to the tape 110. The tape head 130 is currently located at the end position EP of the prior written data file 106-R.

To enable the second portion/remaining portion of data file 106-W2 to be written to tape 110, tape 110 is positioned such that the end position P of first portion 106-W1 is positioned at the tape head 130. As previously mentioned, by knowing position P, as a function of interrupt points 153A-n and OD, the controller component 125 in conjunction with the position component 135 and motor/capstan 155 can reposition (e.g., advance the tape 110 from position EP to position P for the second portion 106-W2 of data 106-W to be written to tape 110. Effectively, the second portion 106-W2 of data 106-W is stitched onto the end of the previously written first portion 106-W1 of data 106-W.

Figure 5:
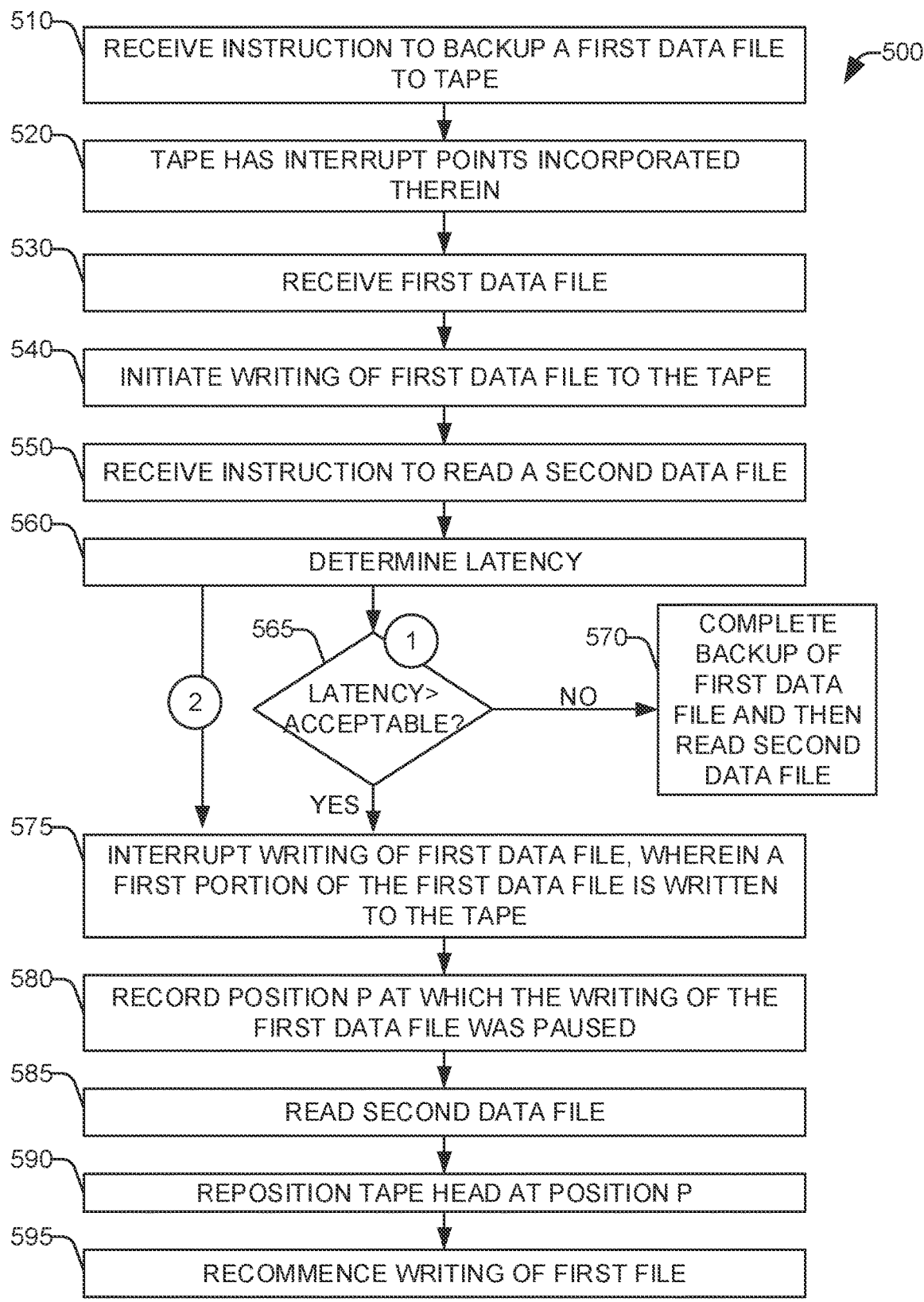
FIG. 5 presents a computer-implemented methodology of a read operation being performed during a write operation, in accordance with one or more embodiments

FIG. 5, schematic 500 illustrates a computer-implemented methodology of a read operation being performed during a write operation, in accordance with one or more embodiments.

At 510, an instruction (e.g., instruction 108A) is received at a tape system (e.g., tape system 120) to perform a write operation of a first data file (e.g., data file 106-W) to a tape (e.g., tape 110).

At 520, a series of regularly spaced interrupt points (e.g., interrupt points 153A-n) are positioned along the length of the tape (e.g., in the direction of tape advance/rewind). Given a combination of a tape write rate (e.g., as applied by controller component 125 in combination with motor/capstans 155 to the tape 110), the interrupt points are spaced at defined intervals such that a known amount of data is stored/written between each adjacent pairs of interrupt points. Information (e.g., information 128A-n) regarding volume/amount of memory between adjacent pairs of interrupt points can be stored. In an embodiment, the sequence of interrupt points on the tape can be read by a positioning component (e.g., position component 135 in conjunction with signals 132A-n from tape head 130).

At 530, the first data file to be written to the tape is obtained/received by the tape system. The size of the data can be of any magnitude, however, writing a large data file to the tape can take an extended period of time.

At 540, a write operation for the data to the tape is initiated. The write operation initiates with a tape head (e.g., tape head 130) positioned at a start point (e.g., SP) at a first end of a data block (e.g., data block 160A), wherein the first end of the data block coincides with a position of a first interrupt point (e.g., FIG. 4, interrupt point 153A) in the series of interrupt points.

At 550, during the write operation being performed, a read operation instruction (e.g., in instruction 108B) is received at the tape system, wherein the read operation may include a flag/notification that the read operation is urgent. The read operation instruction is for a second data file (e.g., data file 106-R), wherein the second data file was written/backed up to the tape prior to the first data file both in regard to physical location of the second data file on the tape and in terms of time, prior to initiation of writing the first data file to the tape.

At 560, in a first scenario of operation, a determination (e.g., by latency component 177) can be performed to identify how much more time (time T) is required to complete the write operation of the first data file to the tape. In an embodiment, time T is a function of tape write rate utilized by the tape system and the tape.

At 565, the time left value T can be compared to a threshold time (e.g., threshold time, latency value LV), wherein the threshold time can be configured based on whether a read data file instruction is received with the data file. In an embodiment, the threshold time LV can be an acceptable latency for the read operation to be performed. An acceptable latency=T<LV, an unacceptable latency=T≥LV.

At 570, in response to a determination that NO, the time left T is less than the threshold time LV, the current write operation can proceed to completion, with the read operation being performed once the current write operation is completed.

At 570, in response to a determination that YES, T≥LV, the current write operation can be temporarily halted/paused at a position P on the tape, whereby the tape can be rewound (e.g., by position component 135 in conjunction with motor/capstans 155) to a position at which the previously saved data file is to be read.

At 580, in a second scenario of operation, rather than initiating a read operation based on a threshold LV, upon receiving the read instruction (e.g., read instruction 108A), the tape system can be configured to immediately cease the write operation currently being performed and initiate the read operation in accordance with the read instruction.

At 585, whether the first scenario of operation occurs, or the second scenario of operation occurs, the tape can be rewound (e.g., by the position component 135 in conjunction with the motor/capstans 155) to the position of the tape (e.g., position PDS) at which the read operation is to be performed on the prior saved data file (e.g., to continue writing data 106-W2 after data 106-W1).

At 590, upon completion of the read operation, the tape can be advanced (e.g., by the position component 135 in conjunction with the motor/capstans 155) to the position of the tape P at which the write operation (e.g., of data 106-W1) was paused, whereupon the write operation can be re-commenced (e.g., writing of data 106-W2). In the event of no further read instructions are received by the tape system, the write operation can be re-commenced to completion (e.g., both the first portion 106-W1 and the second portion 106-W2 are written to the tape). In the event of another read instruction being received prior to completion of the write operation, methodology 500 can return to 550 where a determination can be made regarding interrupting the write operation once again, or not.

Figure 6:
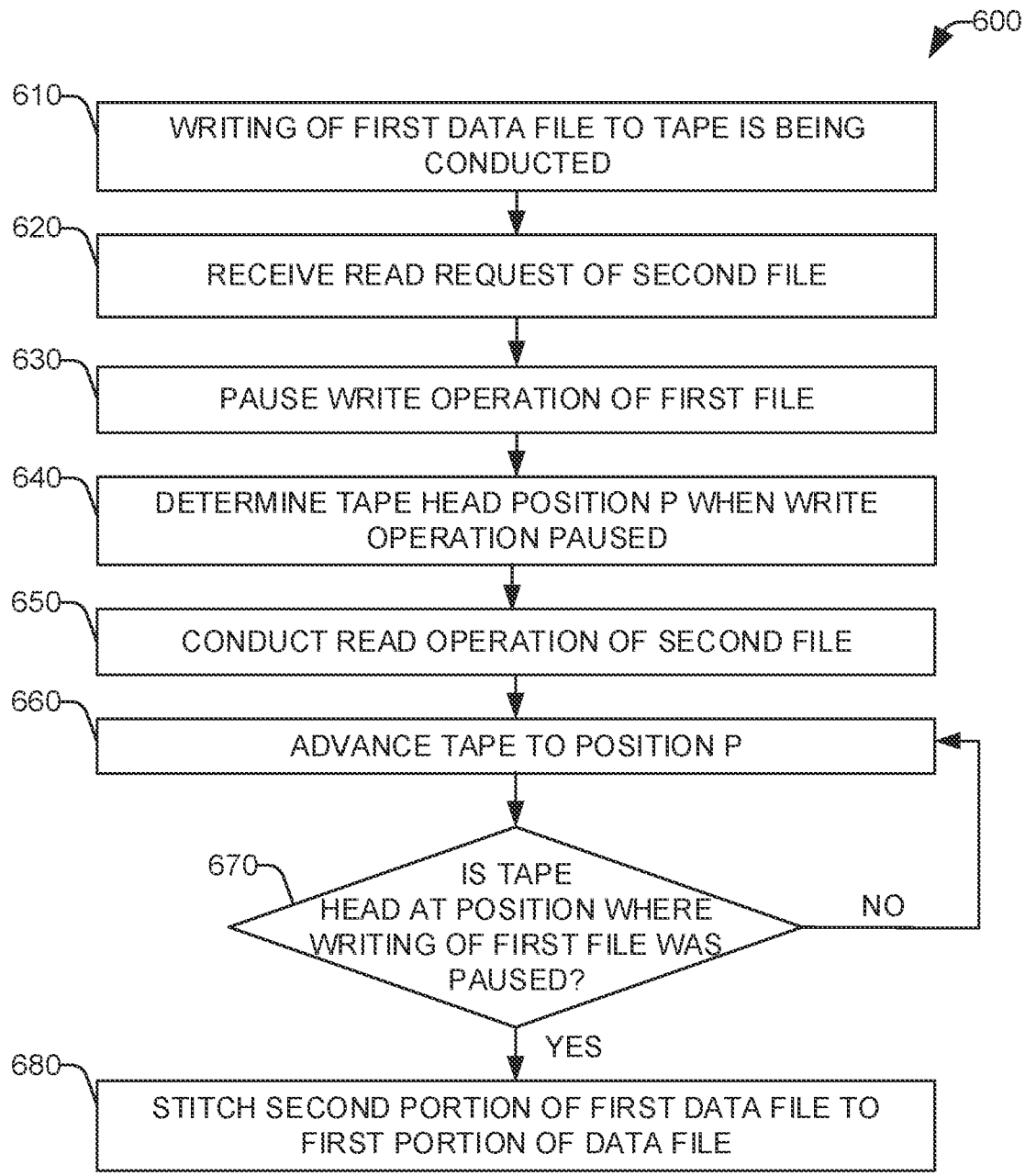
FIG. 6 presents a computer-implemented methodology of a write operation being re-commenced, in accordance with one or more embodiments.

FIG. 6, schematic 600 illustrates a computer-implemented methodology of a write operation being re-commenced, in accordance with one or more embodiments.

At 610, a write operation is being performed, wherein a first data file (e.g., data file 106-W) is being written (e.g., by tape head 130) to a tape (e.g., tape 110). The write operation is performed in response to an instruction (e.g., instruction 108A) received at a controller component (e.g., controller component 125 from an external data system 105).

At 620, a read request/instruction (e.g., instruction 108B) is received at the controller component, wherein the read request includes a requirement for the read request to be conducted immediately.

At 630, the current position of the tape is determined (e.g., by controller component 125 in conjunction with position component 135, per signals 132A-n from tape head 130). As previously mentioned, the tape can include a series of interrupt points (e.g., interrupt points 153A-n) positioned regularly throughout the tape (e.g., throughout header portion 150). A determination can be made regarding the amount of data that was written (e.g., data 106-W1).

At 640, the tape is rewound (e.g., by a position component 135 in conjunction with a motor/capstan 155) to a start position (e.g., position PDS in data block 160D of FIG. 4) of the block of data.

At 650, upon completion of the read operation, the tape is advanced to the position (e.g., position P) on the tape at which the write operation was previously paused. In an embodiment, the position of the tape at which the write position was paused can be inferred based on knowledge of the volume of data already written relative to the respective interrupt points. For example, where 2.6 GB of data has already been written with the interrupt points being positioned every 1 GB, with a write speed of 10 GB per meter, the 2.0 GB of data occupy space on the tape between a first interrupt point and a third interrupt point, and 0.6 GB of data is the offset distance OD at which the write operation was paused at 60 centimetres after the third interrupt point. In an embodiment, an offset distance OD can be determined, wherein the offset distance is a length of the tape between the last interrupt point (e.g., interrupt point 153E of FIG. 4) to be included during writing of the first portion (e.g., first file portion 410-1 of FIG. 4) of the first data file and a resume write position (position P of FIG. 4), wherein the offset distance OD is the length of tape required to store a volume of data in the first written portion that exceeds a volume of data bounded by respective pairs of interrupt points.

At 660, the position of the last byte/portion of data that was written is determined with the tape head positioned at the end of the written data (e.g., the first portion of the first data file 410-1) with the write operation being recommenced to write the currently unwritten portion of the first data file (e.g., the second portion of the first data file 410-2).

At 670, in response to a determination (e.g., by controller component 125 in conjunction with position component 135, per signals 132A-n from tape head 130) that NO, the tape head is not currently located at position P (e.g., a function of the interrupt points 153A-n, size of first file portion 106-W1, distance OD, etc.) at which the writing of the first file was paused, methodology 600 can return to act 660 whereby the tape can be further advanced/rewound to position P at the tape head. As mentioned, the position P can be determined based on a combination of identifying the required interrupt points, offset OD, data signals being read from the tape by the tape head, and suchlike.

At 670, in response to a determination (e.g., by controller component 125 in conjunction with position component 135, per signals 132A-n from tape head 130) that YES, the tape head is currently located at position P methodology 600 can advance to act 680.

At 680, effectively, the end of the first portion of the first data file (e.g., of data 106-W1) is identified and the second portion of the first data file (e.g., data 106-W2) is stitched thereto.

Figure 7:
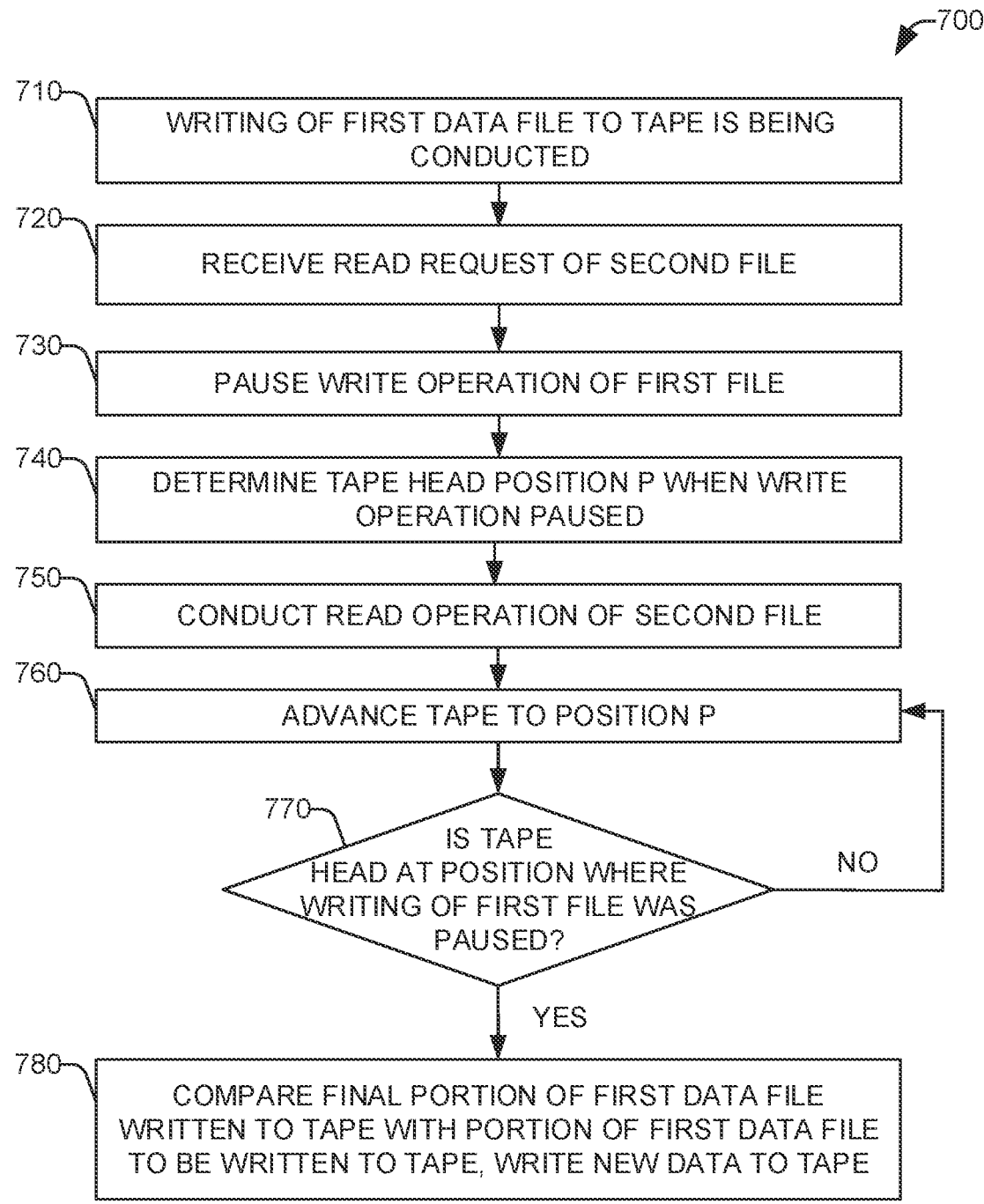
FIG. 7 presents a computer-implemented methodology of a write operation being re-commenced, in accordance with one or more embodiments.

FIG. 7, schematic 700 illustrates a computer-implemented methodology of a write operation being re-commenced, in accordance with one or more embodiments.

At 710, a write operation is being performed, wherein a first data file (e.g., data file 106-W) is being written (e.g., by tape head 130) to a tape (e.g., tape 110). The write operation is performed in response to an instruction (e.g., instruction 108A) received at a controller component (e.g., controller component 125 from an external data system 105).

At 720, a read request/instruction (e.g., instruction 108B) is received at the controller component, wherein the read request includes a requirement for the read request to be conducted immediately.

At 730, the current position of the tape is determined (e.g., by controller component 125 in conjunction with position component 135, per signals 132A-n from tape head 130). As previously mentioned, the tape can include a series of interrupt points (e.g., interrupt points 153A-n) positioned regularly throughout the tape (e.g., throughout header portion 150). A determination can be made regarding the amount of data that was written (e.g., data 106-W1).

At 740, the tape is rewound (e.g., by a position component 135 in conjunction with a motor/capstan 155) to a start position (e.g., position PDS in data block 160D of FIG. 4) of the block of data.

At 750, upon completion of the read operation, the tape is advanced to the position (e.g., position P) on the tape at which the write operation was previously paused. In an embodiment, the position of the tape at which the write position was paused can be inferred based on knowledge of the volume of data already written relative to the respective interrupt points. For example, where 2.6 GB of data has already been written with the interrupt points being positioned every 1 GB, with a write speed of 10 GB per meter, the 2.0 GB of data occupy space on the tape between a first interrupt point and a third interrupt point, and 0.6 GB of data is the offset distance OD at which the write operation was paused at 60 centimetres after the third interrupt point. In an embodiment, an offset distance OD can be determined, wherein the offset distance is a length of the tape between the last interrupt point (e.g., interrupt point 153E of FIG. 4) to be included during writing of the first portion (e.g., first file portion 410-1 of FIG. 4) of the first data file and a resume write position (position P of FIG. 4), wherein the offset distance OD is the length of tape required to store a volume of data in the first written portion that exceeds a volume of data bounded by respective pairs of interrupt points.

At 760, the position of the last byte/portion of data (e.g., of data 106-W1) that was written is determined with the tape head positioned proximate to the of the written data (e.g., data file 106-W1). As the tape head moves over the last portion (e.g., last few bytes/bits of data) in the written data, the last portion of written data can be compared to the initial portion of the remaining data (e.g., data file 106-W2) to identify duplicate data in the last portion of the written data with the initial portion of the remaining data. The duplicate data can indicate where the written data in the first portion of the first data file ends and the unwritten, second portion of the first data file starts, enabling the write operation to be recommenced to write the currently unwritten portion of the first data file (e.g., data file 106-W2).

At 770, in response to a determination (e.g., by controller component 125 in conjunction with position component 135, per signals 132A-n from tape head 130) that NO, the tape head is not currently located at position P (e.g., a function of the interrupt points 153A-n, size of first file portion 106-W1, distance OD, etc.) at which the writing of the first file was paused, methodology 700 can return to act 760 whereby the tape can be further advanced/rewound to position P at the tape head. As mentioned, the position P can be determined based on a combination of identifying the required interrupt points, offset OD, data signals being read from the tape by the tape head, and suchlike.

At 770, in response to a determination (e.g., by controller component 125 in conjunction with position component 135, per signals 132A-n from tape head 130) that YES, the tape head is currently located at position P methodology 700 can advance to act 780.

At 780, effectively, the end of the first portion of the first data file (e.g., of data 106-W1) is identified and the second portion of the first data file (e.g., data 106-W2) is written from the end of the first portion of the first data file.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Per the various embodiments presented herein, various components included in the tape system 120 such as the controller component 125, the position component 135, the latency component 177, and suchlike, can include AI and ML and reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, determining (e.g., by controller component 125) a position P at which a write operation (e.g., of data 106-W to tape 110) is paused and subsequently recommenced from, and suchlike, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., determining position P to recommence a write operation from).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier (s) can be used to automatically learn and perform a number of functions, including but not limited to determining according to predetermined criteria, pausing a write operation and determination of position P, for example.

As described supra, inferences can be made, and automated operations performed, based on numerous pieces of information. For example, a position P on a tape 110 at which a write operation of a data file 106-W (e.g., of a first portion of the data file 106-W) is paused, such that when the second portion of the data file 106-W is to be written, the point at which to place the tape head 130 can be determined, e.g., relative to a nearest/prior interrupt point 153A-n.

Example Applications and Use

Figure 8:
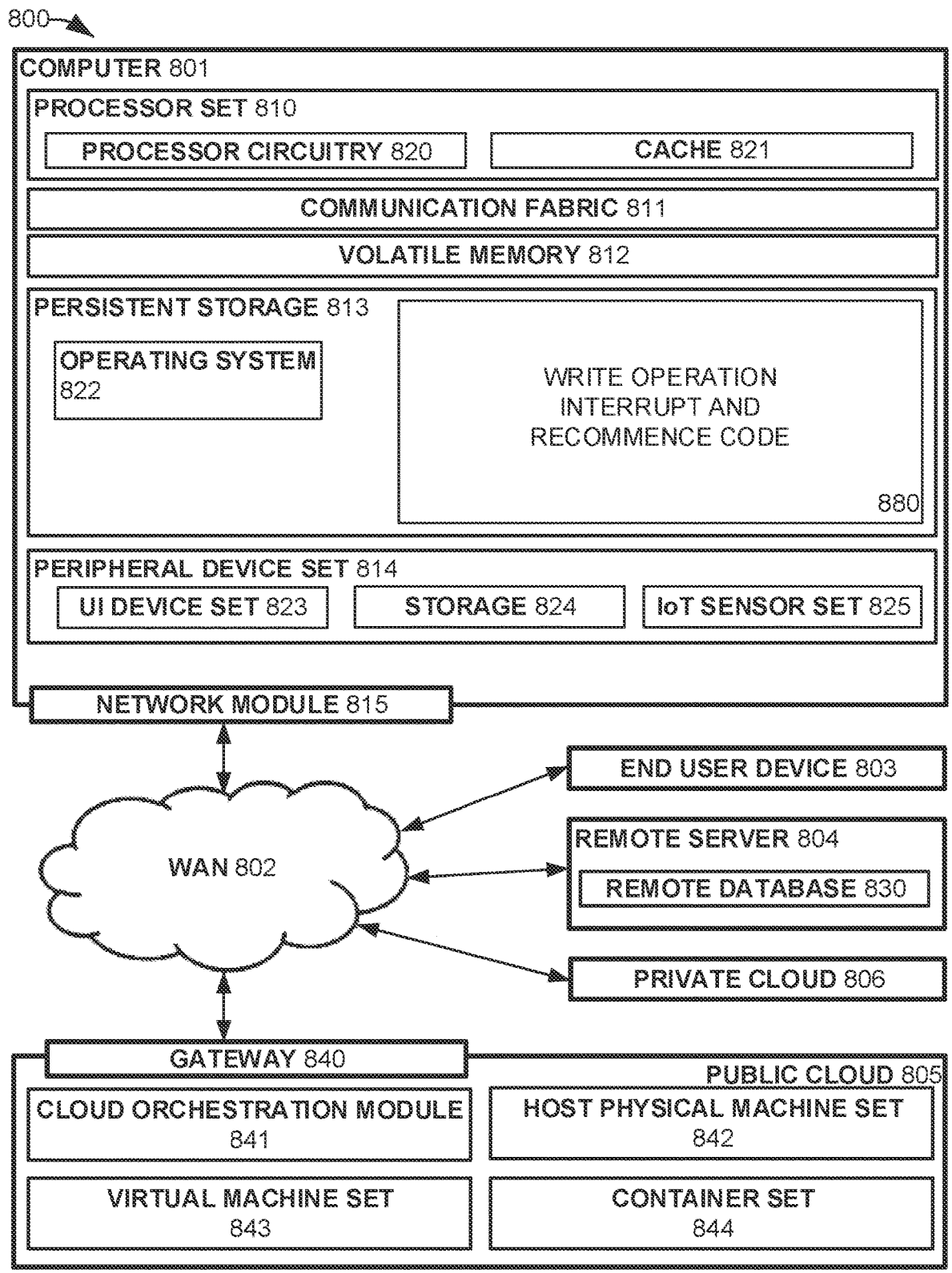
FIG. 8 depicts an example schematic block diagram of a computing environment with which the disclosed subject matter can interact/be implemented at least in part, in accordance with various aspects and implementations of the subject disclosure.

FIG. 8 and the following discussion are intended to provide a brief, general description of a suitable computing environment 800 in which one or more embodiments described herein at FIGS. 1-7 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as pausing a write operation while a read operation is performed, as controlled by a controller component (e.g., by controller component 125 pausing writing of data file 106-W) through the application of write operation interrupt and recommence code 880. In addition to block 880, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 880, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method can be distributed among multiple computers and/or between multiple locations. On the other hand, in this presentation of computing environment 800, detailed discussion is focused on a single computer, specifically computer 801, to keep the presentation as simple as possible. Computer 801 can be located in a cloud, even though it is not shown in a cloud in FIG. 8. On the other hand, computer 801 is not required to be in a cloud except to any extent as can be affirmatively indicated.

PROCESSOR SET 810 includes one, or more, computer processors of any type now known or to be developed in the future. Processing circuitry 820 can be distributed over multiple packages, for example, multiple, coordinated integrated circuit chips. Processing circuitry 820 can implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set can be located "off chip." In some computing environments, processor set 810 can be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods can be stored in block 880 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory can be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 can be a read only memory (ROM), but typically at least a portion of the persistent storage allows writing of data, deletion of data and re-writing of data. Some familiar forms of persistent storage include magnetic disks and solid-state storage devices. Operating system 822 can take several forms, such as various known proprietary operating systems or open-source Portable Operating System Interface type operating systems that employ a kernel. The code included in block 880 typically includes at least some of the computer code involved in performing the inventive methods.

PERIPHERAL DEVICE SET 814 includes the set of peripheral devices of computer 801. Data communication connections between the peripheral devices and the other components of computer 801 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 can include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 can be persistent and/or volatile. In some embodiments, storage 824 can take the form of a quantum computing storage device for storing data in the form of qubits. In embodiments where computer 801 is required to have a large amount of storage (for example, where computer 801 locally stores and manages a large database) then this storage can be provided by peripheral storage devices designed for storing large amounts of data, such as a storage area network (SAN) that is shared by multiple, geographically distributed computers. IoT sensor set 825 is made up of sensors that can be used in Internet of Things applications. For example, one sensor can be a thermometer and another sensor can be a motion detector.

NETWORK MODULE 815 is the collection of computer software, hardware, and firmware that allows computer 801 to communicate with other computers through WAN 802. Network module 815 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and can take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 can be a client device, such as thin client, heavy client, mainframe computer and/or desktop computer.

REMOTE SERVER 804 is any computer system that serves at least some data and/or functionality to computer 801. Remote server 804 can be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data can be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs can be stored as images and can be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware and firmware allowing public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the Figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes the computer executable components stored in the memory, wherein the computer executable components comprise:
   a tape control component configured to:
      control a write operation, wherein the write operation comprises writing a first data file to a tape, wherein the tape is configured with a series of regularly spaced interrupt points positioned along a length of the tape, and a distance between a pair of adjacent interrupt points equates to a known volume of data stored on the tape for a given feed rate of the tape;
      receive a read file instruction identifying a second data file to be read from the tape; and
      in response to the read file instruction being received during the write operation, pause the write operation to enable the second data file to be read, wherein the write operation is paused after a first portion of the first data file has been written to the tape, and a second portion of the first data file remains to be written to the tape.

2. The system of claim 1, wherein the tape control component is further configured to control operation of a motor to position the tape to enable the second data file to be read, wherein the second data file was recorded to the tape prior to the first portion of the first data file.

3. The system of claim 1, wherein the tape control component is further configured to:

determine a volume of data comprising the first portion of the first data file;
determine a sequence of interrupt points included in the first portion of the first data file;
determine a first volume of data stored across the sequence of interrupt points;
determine a second volume of data, wherein the second volume of data comprises the volume of data in the first portion of the first data file that exceeds the first volume of data; and
determine an offset distance, wherein the offset distance is a length of the tape between the last interrupt point to be included during writing of the first portion of the first data file and a resume write position and equates to a length of tape required to store the second volume of data for a given tape write rate utilized when storing data to the tape.

4. The system of claim 3, wherein the tape control component is further configured to control operation of a motor and at least one capstan to facilitate positioning the tape with the resume write position of the tape located adjacent to a tape head.

5. The system of claim 4, wherein the tape control component is further configured to control operation of the tape head to resume writing of the first data file to the tape, wherein writing of the second portion of the first data file to the tape resumes at the resume write position.

6. The system of claim 4, wherein the tape control component is further configured to control operation of the tape head to update information regarding a location of the first data file on the tape, wherein the updated information is stored in a header portion of the tape.

7. The system of claim 1, wherein the series of regularly spaced interrupt points are incorporated into a header portion of the tape.

8. The system of claim 1, further comprising a latency component configured to:
   determine whether a time to complete writing the first data file exceeds an acceptable delay in reading the second data file; and
   in response to a determination that the time to complete writing of the first data file exceeds the acceptable delay, generate a write pause instruction to pause the write operation and initiate the reading of the second data file.

9. The system of claim 8, wherein the tape control component is further configured to:
   in response to receiving the write pause instruction, pause the write operation and instruct a motor to position a tape head at a start of the second data file; and
   commence reading of the second data file.

10. A computer-implemented method performed by a device operatively coupled to a processor, the computer-implemented method comprising:
    initiating backup of a first data file to a tape, wherein the tape is configured with a series of interrupt points regularly spaced along a length of the tape, and a distance between a pair of adjacent interrupt points equates to a known volume of data stored on the tape for a known tape write rate;
    receiving a read data file instruction, wherein the read data file instruction is to read a second data file previously saved to the tape;
    pausing the backup of the first data file to the tape; and initiating a read operation of the second data file, wherein a first portion of the first data file has been saved to the tape at a time of initiating the read operation of the second data file.

11. The computer-implemented method of claim 10, further comprising:
based on completion of reading the second data file, resuming the write operation to save a second portion of the first data file to the tape.

12. The computer-implemented method of claim 11, further comprising:
identifying position of the series of interrupt points on the tape;
determining a first length of the tape occupied by the first portion of the first data file, wherein the first length of the tape is based on a volume of data stored in the first portion of the first data file and the known tape write rate;
determining a number of interrupt points included in the first portion of the first data file stored on the tape;
determining a second length of tape between a first interrupt point in the series of interrupt points and a last interrupt point in the series of interrupt points, wherein the first length of the tape occupied by the first portion of the first data file initiates at the first interrupt point in the series of interrupt points and includes the last interrupt point in the series of interrupt points; and
determining an offset distance, wherein the offset distance is a difference between the first length of the tape and the second length of tape.

13. The computer-implemented method of claim 12, further comprising:
positioning a tape head at a recommence writing position, wherein the recommence writing position is the offset distance from a position of the last interrupt point.

14. The computer-implemented method of claim 13, further comprising:
recommencing, at the recommence writing position, the backup of the first data file to the tape facilitating writing of the second portion of the first data file to the tape.

15. A computer program product stored on a non-transitory computer-readable medium and comprising machine-executable instructions, wherein, in response to being executed, the machine-executable instructions cause a machine to perform operations, comprising:
initiating backup of a first data file to a tape, wherein the tape is configured with a series of interrupt points regularly spaced along a length of the tape, and a distance between a pair of adjacent interrupt points equates to a known volume of data stored on the tape for a known tape write rate;
receiving a read data file instruction, wherein the read data file instruction is to read a second data file previously saved to the tape;
pausing the backup of the first data file to the tape; and
initiating a read operation of the second data file, wherein a first portion of the first data file has been saved to the tape at a time of initiating the read operation of the second data file.

16. The computer program product according to claim 15, wherein the operations further comprise:
based on completion of reading the second data file, resuming the write operation to save a second portion of the first data file to the tape.

17. The computer program product according to claim 16, wherein the operations further comprise:
identifying position of the series of interrupt points on the tape;
determining a first length of the tape occupied by the first portion of the first data file, wherein the first length of the tape is based on a volume of data stored in the first portion of the first data file and the known tape write rate;
determining a number of interrupt points included in the first portion of the first data file stored on the tape;
determining a second length of tape between a first interrupt point in the series of interrupt points and a last interrupt point in the series of interrupt points, wherein the first length of the tape occupied by the first portion of the first data file initiates at the first interrupt point in the series of interrupt points and includes the last interrupt point in the series of interrupt points; and
determining an offset distance, wherein the offset distance is a difference between the first length of the tape and the second length of tape.

18. The computer program product according to claim 17, wherein the operations further comprise:
positioning a tape head at a third position, wherein the third position is the offset distance from a position of the last interrupt point.

19. The computer program product according to claim 18, wherein the operations further comprise:
recommencing, at the third position, the backup of the first data file to the tape facilitating writing of the second portion of the first data file to the tape.

20. The computer-implemented method of claim 10, wherein the series of interrupt points are incorporated into a header portion of the tape.

* * * * *